US008340057B2

(12) United States Patent
Abujbara

(10) Patent No.: US 8,340,057 B2
(45) Date of Patent: Dec. 25, 2012

(54) AUTOMATED WIRELESS ACCESS TO PERIPHERAL DEVICES

(75) Inventor: Nabil M. Abujbara, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1470 days.

(21) Appl. No.: 11/644,317

(22) Filed: Dec. 22, 2006

(65) Prior Publication Data

US 2008/0151847 A1    Jun. 26, 2008

(51) Int. Cl.
*H04W 4/00* (2009.01)
(52) U.S. Cl. ........ 370/338; 370/328; 370/329; 370/331; 455/456.1; 455/456.5
(58) Field of Classification Search .................. 370/338, 370/328, 329, 331; 455/436, 456.1, 456.5
See application file for complete search history.

(56) References Cited

U.S. PATENT DOCUMENTS

| 6,457,640 | B2 | 10/2002 | Ramachandran | 235/379 |
|---|---|---|---|---|
| 6,795,700 | B2 | 9/2004 | Karaoguz et al. | 455/408 |
| 6,862,444 | B2 | 3/2005 | Karaoguz et al. | 455/408 |
| 6,885,859 | B2 | 4/2005 | Karaoguz et al. | 455/408 |
| 7,243,233 | B2 | 7/2007 | Kindberg et al. | 713/171 |
| 7,564,812 | B1 * | 7/2009 | Elliott | 370/329 |
| 2004/0179502 | A1 * | 9/2004 | Naghian et al. | 370/338 |
| 2005/0176420 | A1 * | 8/2005 | Graves et al. | 455/424 |
| 2005/0260996 | A1 | 11/2005 | Groenendaal | 455/445 |
| 2006/0014520 | A1 | 1/2006 | Anderson et al. | 455/408 |
| 2007/0052994 | A1 * | 3/2007 | Gullett et al. | 358/1.15 |

FOREIGN PATENT DOCUMENTS

WO   WO 2007071009 A1 * 6/2007

OTHER PUBLICATIONS

E.J. Thomas, "Ultra-Wideband: Four Years Later", 2006 International CES Press Event, Jan. 5, 2006.
A. Anton, et al., "Best Current Practices for Wireless Internet Service Provider (WISP) Roaming", Wi-Fi Alliance, Release Date: Feb. 2003, Version 1.0.
Y. Katayama and B. Gaucher, "One-Minute Introduction to mmWave Technology and Applications", May 2006, pp. 1 and 2.
Cisco Systems, "Cisco Metropolitan Mobile Network Solutions", 2004, pp. 1 to 7.
NFC Forum, "Near Field Communications and the NFC Forum: The Keys to Truly Interoperable Communications", 2006, pp. 1 to 12.

* cited by examiner

*Primary Examiner* — Christopher M Brandt
*Assistant Examiner* — Jing Gao
(74) *Attorney, Agent, or Firm* — Fitzpatrick, Cella, Harper & Scinto

(57) ABSTRACT

A mobile device is provided with access to peripheral devices networked at a wireless hotspot. The mobile device is authenticated to a service provider server using a wireless network at the wireless hotspot. An authorization is received from the service provider server to the peripheral devices networked at the wireless hotspot, and the mobile device wirelessly accesses services of an authorized peripheral device via the wireless network at the hotspot.

22 Claims, 4 Drawing Sheets

AUTOMATED WIRELESS ACCESS TO PERIPHERAL DEVICES

BACKGROUND OF THE INVENTION

1. Field of the Invention

The present invention relates to accessing peripheral devices networked at a wireless hotspot. More specifically, the present invention relates to authenticating a mobile device and sending an authorization to peripheral devices networked at the wireless hotspot that can be accessed by the mobile device.

2. Description of the Related Art

Currently, there are thousands of "wireless hotspots" across the world. A wireless hotspot is an area or venue offering wireless access to the Internet via a local wireless network. Ordinarily, this is achieved using an "access point", which is a device that relays data between wireless and wired networks. For example, a coffee shop may install an access point to provide a wireless hotspot for customers who wish to obtain Internet access. Similarly, universities, municipalities, and amusement theme parks may provide wireless Internet access to students, residents, and visitors, respectively, by installing several access points around campuses, city blocks, and theme park grounds.

There are well-established protocols for obtaining Internet access at wireless hotspots operated by different Wireless Internet Service Providers (WISPs). For example, the WISPr protocol allows mobile users to "roam" between wireless networks served by different WISPs while using the access credentials of their home service provider. In this regard, Authentication, Authorization, and Accounting (AAA) servers provide support to protocols such as WISPr by allowing WISPs to authenticate, monitor, and bill users for Internet access at the hotspot. Thus, for example, an AAA server managed by the local WISP can authenticate a user at a hotspot and send usage records to an AAA server of a "home entity" which maintains a user's account, so that the home entity can bill the user for the Internet access privileges obtained at the "foreign" hotspot. The WISPs supporting WISPr usually have agreements for sharing the revenues collected from the end users who take advantage of the roaming convenience.

As the use of wireless hotspots proliferates, users will want conveniences that are now found primarily in a home network, such as access to peripheral devices, to be available while the user is away from home. For example, a user on vacation with a digital video camera may wish to burn a DVD of his video images to give to a friend before returning home. Similarly, the user of a digital still camera may wish to print photos of images to share with friends and family members while still on vacation.

However, as opposed to WISPr and other established protocols for gaining authenticated wireless Internet access and accounting for that access, there is currently not anything comparable to provide authentication, authorization, and accounting for mobile devices to gain access to peripheral devices located at a wireless hotspot.

SUMMARY OF THE INVENTION

The present invention addresses the foregoing by providing a mobile device with access to peripheral devices networked at a wireless hotspot. The mobile device is authenticated to a service provider server via a wireless network at the wireless hotspot. An authorization is received from the service provider server to the peripheral devices networked at the wireless hotspot, and the mobile device wirelessly accesses services of an authorized peripheral device via the wireless network at the hotspot.

The foregoing provides a mobile device with authentication, authorization, and accounting (AAA) for access to peripheral devices at wireless hotspots, ordinarily without requiring interaction from the user. Additionally, only low-volume data such as authentication information is transferred over the Internet, while high-volume data such as video images are transferred locally between the mobile devices and peripheral devices, on the hotspot local network. Thus, it may be possible to reduce mobile device usage of the service provider server, making the server available to more users over a period of time, and to reduce usage of broadband bandwidth, thus allowing more internet bandwidth to be available to other hotspot users. It may also be possible to reduce wear and tear on physical connectors of the mobile device or the peripheral device, since the mobile device and peripheral device are not necessarily required to have a wired connection.

In another aspect, the invention provides a wireless hotspot with a wireless network accessible by a mobile device and peripheral devices networked at the wireless hotspot, and a service provider server configured to authenticate the mobile device to allow the mobile device access to peripheral devices networked at the wireless hotspot. The mobile device is authenticated to the service provider server using a wireless network at the wireless hotspot. The peripheral devices networked at the hotspot are sent an authorization, and the mobile device wirelessly accesses services of an authorized peripheral device via the wireless network at the hotspot based on the authorization.

In yet another aspect of the invention, a mobile device transmits authentication information to a service provider server using a wireless network at a wireless hotspot, and wirelessly accesses services of a peripheral device via the wireless network at the wireless hotspot.

In still another aspect of the invention, a service provider server receives authentication information from a mobile device in the wireless hotspot, and sends an authorization to peripheral devices networked at the wireless hotspot.

In a preferred embodiment, the service provider server determines the location of the wireless hotspot where the mobile device is located using information received from the mobile device, and the service provider server instructs authorized peripheral devices within the wireless hotspot that are able to communicate with the mobile device to announce themselves to the mobile device over the wireless network. The mobile device displays the availability of the peripheral devices that are able to communicate with the mobile device using the wireless announcements received from the peripheral devices.

In another preferred embodiment, the mobile device is authenticated to the service provider server using information stored in a memory of the mobile device prior to entering the wireless hotspot.

In another embodiment, the peripheral devices announce their presence to the mobile device using encrypted messages, and the mobile device is sent decryption information from the service provider server to decrypt the messages.

In yet another embodiment, the accessed peripheral device records usage information pertaining to the amount of usage of the peripheral device by the mobile device, and transmits the recorded usage information to the service provider server for billing for the services.

Additional objects, advantages, and features of the invention will become apparent to those skilled in the art upon

DETAILED DESCRIPTION OF THE PREFERRED EMBODIMENT

Figure 1:
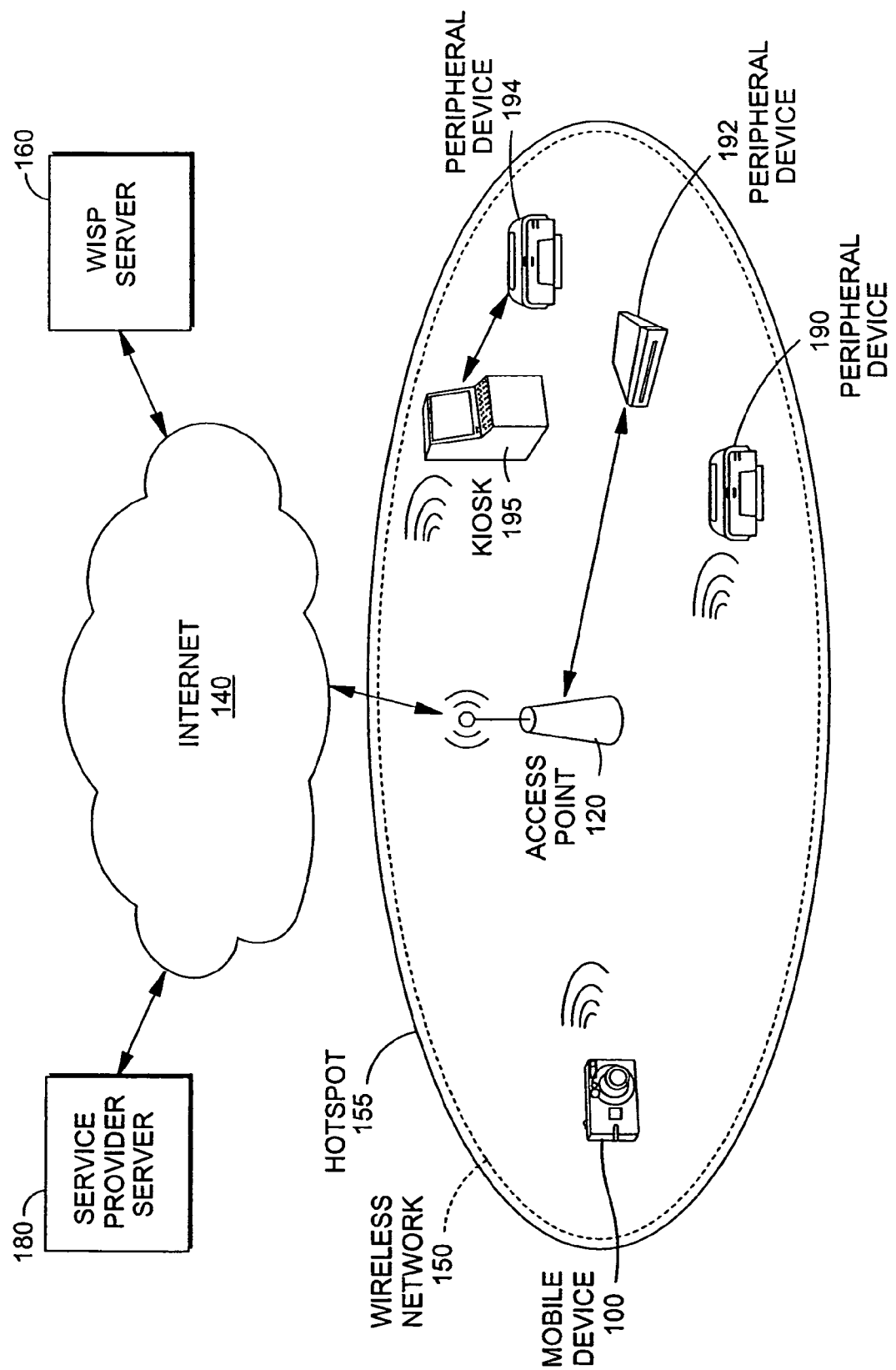
FIG. 1 illustrates an example of an environment in which the present invention may be practiced.

FIG. 1 depicts one example of an environment in which the present invention may be practiced.

Briefly, as shown in FIG. 1, a wireless hotspot system includes a wireless network, such as wireless network 150. Wireless network 150 may establish the size or range of the "wireless hotspot" 155. Peripheral devices 190, 192, and 194 are networked at hotspot 155.

Additionally, as shown in FIG. 1, WISP server 160 is connected to the Internet 140. The WISP server is configured to authenticate the mobile device 100 via the wireless network 150 at hotspot 155 to allow mobile device 100 access to the Internet 140, although the present invention may be practiced without a WISP server as described more fully below. Also connected to Internet 140 is service provider server 180, which is configured to authenticate mobile device 100 over Internet 140 to allow access to peripheral devices 190, 192, and 194 networked at hotspot 155. One or more of peripheral devices 190, 192 and 194 is sent an authorization, and mobile device 100 wirelessly accesses services of an authorized peripheral device via the wireless network 150 at the hotspot 155, based on the authorization.

In the embodiment shown in FIG. 1, wireless network 150 is an infrastructure network to which access is established using access point 120. Access point 120 is not necessarily required for operation of the invention, such as in the case of ad-hoc wireless networks. Access point 120 is a device which communicates with wireless devices and also connects to a wired network to communicate with "wired" devices such as computers connected to Internet 140. Thus, an access point relays data between wireless and wired devices. In addition, access point 120 can also function as a middleman between wireless devices. For example, access point 120 can route data from mobile device 100 to peripheral device 190, thereby extending the communication range of each device. One example of a standard set for such communication is described in the IEEE 802.11 standard set, which is comprised of various additions to the original IEEE 802.11 standard released in 1997, and the contents all of which are incorporated herein by reference.

As discussed above, a "wireless hotspot" such as hotspot 155 is simply an area which offers wireless access to the Internet. In this regard, "hotspot" is essentially a popular term for a geographic area or range offering such wireless access, usually defined by the range of the wireless network which exists at the hotspot. Based on the size of the geographic area, the terms "wireless zone" and "wireless cloud" are also used to signify a wireless network spanning a city block or a whole city, respectively, and should be synonymous with "hotspot" for the purposes of this invention. Additionally, although some persons consider "hotspot" to mean only commercial embodiments in which users pay for access to the Internet, "hotspot" as defined in this description simply refers to the geographic area described above, regardless of whether the user is charged for access or not.

In one embodiment, the size of wireless network 150, and thus hotspot 155, is determined by the wireless transmission range of access point 120. However, other arrangements are possible. For example, multiple access points may also be placed such that the respective local wireless networks overlap, spreading the effective "hotspot" area across communities, cities, or larger.

Of course, other embodiments which do not use a dedicated access point are also within the scope of the invention. For example, a network could be constructed wherein mobile device 100 is configured to communicate directly with computers such as WISP server 160 or service provider server 180, as well as peripheral devices 190, 192 and 194. These types of arrangements, in which devices discover each other and communicate directly without involving access points, are sometimes called "ad-hoc" networks. Additionally, the invention could be implemented using a "WiMax" network such as that described in IEEE standard IEEE Std 802.16e-2005, approved by the IEEE-SA Standards Board on Dec. 7, 2005 and published on Feb. 28, 2006, the contents of which are incorporated herein by reference.

In another embodiment, communication between devices, such as the mobile device, access point, peripheral devices, etc., could occur via short-range wireless technologies (also known as "personal area network" technologies) such as Near-Field Communication (NFC) technology, for example as described in ISO/IEC 18092/ECMA-340 and ISO/IEC 21481/ECMA-352, published on Mar. 24, 2004 and Jan. 10, 2005, respectively, the contents of which are also incorporated herein by reference. Another possible short-range wireless technology is millimeter Wave technology, for example as described in IEEE 802.15.4-2006, approved in June 2006 and published in September 2006, which is a revision of IEEE 802.15.4-2003 standard, the contents of both of which are incorporated herein by reference. Yet another possible short-range wireless technology is Ultra Wide Band (UWB) technology, for example as described in the IEEE 802.15 standards.

Peripheral devices 190, 192, and 194 are networked at hotspot 155. FIG. 1 depicts peripheral devices 190 and 194 as printers and peripheral device 192 as a DVD burner, but it should be understood that a peripheral device can be any device which offers services to a user. For example, peripheral devices can include printers, DVD recorders, CD recorders, scanners, disk drives, tape drives, microphones, speakers, cameras, media players, media servers, or computers connected to the Internet. For purposes of simplicity, only peripheral devices 190, 192 and 194 are shown in FIG. 1, but any number of peripheral devices could be at a hotspot.

Some peripheral devices can independently wirelessly communicate with other devices via a wireless network. For example, peripheral device 190 is a wireless printer which has the ability to wirelessly communicate with mobile device 100. This can be done between the two devices by relaying through access point 120, or the devices could be configured to communicate with each other without an access point.

However, other devices may not have wireless capabilities, and may require additional hardware in order to communicate wirelessly. For example, as shown in FIG. 1, peripheral device 194 is a legacy printer which does not have wireless capabilities of its own. However, peripheral device 194 is connected to kiosk 195, which includes a device with wireless capabilities. In this way, kiosk 195 provides peripheral device 194 with the ability to wirelessly communicate with mobile device 100.

Alternatively, a peripheral device such as peripheral device 192 may have wired network connectivity and still be able to communicate wirelessly to mobile device 100. This may be done, for example, by connecting peripheral device 192 to access point 120, as shown in FIG. 1, or to a router with a built-in wireless access point function and ports for connecting wired network peripheral devices. The wired network traffic between the wired peripheral device and the wireless mobile devices can then be routed by the access point. Of course, these are simply examples, and it should be understood that other hardware arrangements are possible.

As shown in FIG. 1, Wireless Internet Service Provider (WISP) server 160 is connected to Internet 140. WISP server 160 is a server computer or other device which authenticates a mobile device so as to allow the mobile device wireless access to the Internet. In one embodiment, the WISP server receives authentication information from mobile devices, and may determine based on the information whether a user or mobile device is permitted (authenticated) to wirelessly access Internet 140 via, for example, access point 120.

However, it must be emphasized that WISP server 160 is not required for operation of the invention. In particular, it is common today that many wireless hotspots do not restrict access to the Internet. Thus, for example, a mobile device user may not be required to authenticate his or herself to a WISP server or pay for Internet access. In such embodiments, WISP server 160 would not be required to gain wireless access to the Internet, and thus would not be required in the invention.

Service provider server 180 is also connected to Internet 140. Service provider server 180 is a computer or other device which determines whether a mobile device is permitted to access peripheral devices located within the vicinity of hotspot 155, and which sends an authorization to peripheral devices located within the vicinity of the hotspot. In the embodiment shown in FIG. 1, service provider server 180 communicates with wireless devices such as peripheral devices 190, 192, and 194 through access point 120 and its wireless network 150.

Of course, service provider server 180 may be configured to communicate with devices in the hotspot in other ways. For example, while FIG. 1 depicts service provider server 180 as connected to Internet 140, service provider server 180 would not necessarily need use Internet 140 to communicate with other devices. Thus, in one embodiment, service provider server 180 could be equipped with wireless capabilities, and could communicate over a local wireless network to act as a "local" service provider server for the peripheral devices networked at a hotspot such as hotspot 155.

On the other hand, service provider server 180 could perform its functions for hundreds or even thousands of mobile devices and peripheral devices, and would not be necessarily limited to communicating with the peripheral devices located at a single hotspot such as hotspot 155. The functions of service provider server 180 will be described in more detail below.

Mobile device 100 is depicted as a digital camera in FIG. 1, but may be any device that is able to wirelessly communicate with other devices on wireless network 150. Thus, mobile device 100 may be, for example, a digital camera, a video camera, a laptop, a cellular phone, a smartphone, a personal digital assistant (PDA), a portable video game console, a portable media storage/player device (such as an iPod), or a handheld television, among many others.

A process for storing authentication information and instructions in a mobile device prior to entering a wireless hotspot will now be described with respect to FIG. 2. Typically, this process would occur only once, and would be performed more conveniently at a home or office network as part of setting up the mobile device for subsequent access to a service provider server when the mobile device is roaming.

In step 201, the user subscribes or signs up for wireless access to peripheral devices serviced by one or more service providers. This could be accomplished by accessing a website of the service provider at the home or office. Thus, for example, a user could enter account information at a website of a service provider in order to subscribe to its services. Of course, this step could also be accomplished in other ways, such as sending information by mail or other traditional communication methods.

For example, a user may sign up with a service provider which manages printing and DVD recording services at hotspots such as coffee shops or airports. A user may subscribe to several service providers to obtain access to multiple sets or types of devices, or conversely one service provider may offer multiple sets or types of devices on its own.

Additionally, a mobile device owner may also sign up for wireless internet access with one or more WISPs in the manner described above. As noted above, this may not be necessary if the wireless hotspot accessed by the user does not require authentication of the mobile device or payment. Nonetheless, a user might wish to subscribe to one or more WISPs to ensure total wireless hotspot network coverage, such as while traveling, on college campuses, at coffee shops, in amusement parks, and so on.

In step 202, information regarding the user's account or mobile device is stored in a memory of the mobile device 100. For example, mobile device 100 may store an access profile for each service provider including a profile name, security credentials, a mode of communication, a connection mode, a communication protocol, an account number or status, or any other information which the service provider desires. This information could be stored in the mobile device by downloading to a user's PC at the home or office and then transferring the information to the mobile device via a wired or wireless network, or by any number of other methods. By storing this information, mobile device 100 has the information required for authentication ready for transmission to service provider server 180 prior to entry to a wireless hotspot.

In step 203, software for the process of authenticating the mobile device to the service provider server 180 and/or WISP server 160 is stored in a memory of mobile device 100. This information could contain, for example, a program instructing mobile device 100 to contact service provider server 180 upon detecting an active Internet connection, and to transmit the information stored in its memory to the server for authentication. It should be understood that one skilled in the art could implement this step in any number of ways. For example, this information could be downloaded directly to mobile device 100 from the website of the WISP or service provider, or could be downloaded to a home computer for transmission to mobile device 100.

At the conclusion of step 203, mobile device 100 is configured to contact the necessary server and send the authentication information on its own, which allows mobile device 100 to subsequently access the Internet and/or the service provider server at a hotspot without further interaction by the user.

In this regard, it should be noted that the information for authentication need not necessarily be tied to an account for billing purposes, and that the information need not include security credentials such as a password or ID number. For example, a service provider may wish to provide free access to peripheral devices at certain locations or at certain times, such as during promotions. Thus, in one embodiment, the authentication information could be as simple as information identifying mobile device 100 sent to the service provider server, without any associated security or billing concerns.

A process of a mobile device gaining wireless access to a peripheral device at a wireless hotspot will now be described in connection with FIG. 3.

Figure 3:
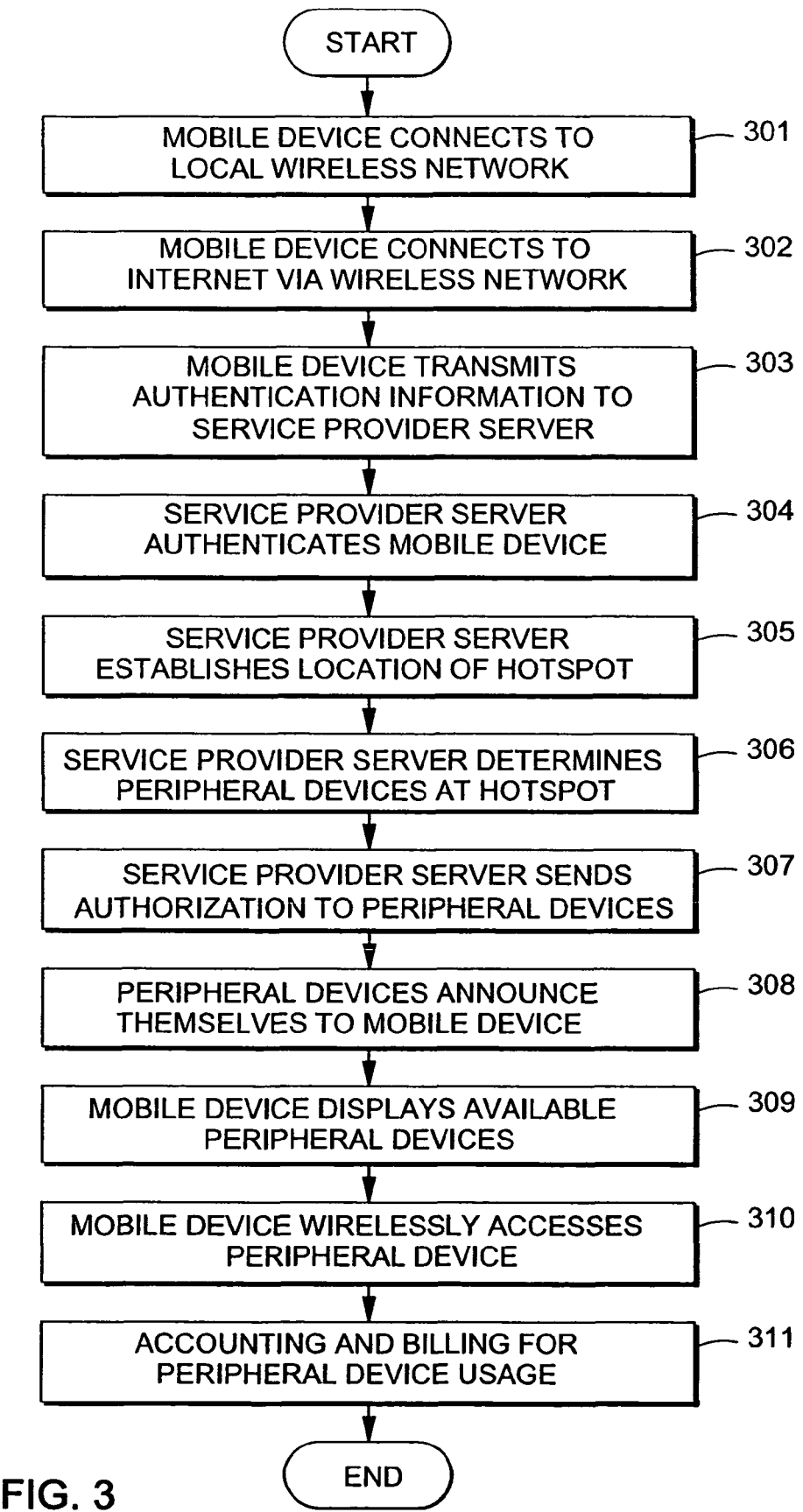
FIG. 3 illustrates one example of a process of wirelessly accessing services of a peripheral device at a wireless hotspot.

Briefly, as shown in FIG. 3, mobile device 100 is authenticated over Internet 140 to service provider server 180 using wireless network 150 at the wireless hotspot 155. Next, one or more of peripheral devices 190, 192, and 194 networked at hotspot 155 receive an authorization from service provider server 180. Mobile device 100 then wirelessly accesses services of an authorized peripheral device via the wireless network 150 at the hotspot 155.

The accessed peripheral device may record usage information pertaining to the amount of usage of the peripheral device by mobile device 100, and may transmit the recorded usage information to service provider server 180 for billing for the services. Additionally, mobile device 100 may be authenticated to service provider server 180 using information stored in a memory of mobile device 100 prior to entering hotspot 155, as described above in connection with FIG. 2.

In step 301, the user enters wireless hotspot 155 with mobile device 100, and mobile device 100 connects to local wireless network 150 via access point 120. The mobile device may detect one or more wireless networks located at hotspot 155. In one common example, this is done by detecting broadcasts from access point 120 associated with the wireless network. These broadcasts include the SSID (Service Set Identifier, "Network name") via packets that are called beacons. Based on the settings (e.g. the SSID), mobile device 100 may decide whether to connect to a particular access point and its corresponding wireless network.

Figure 2:
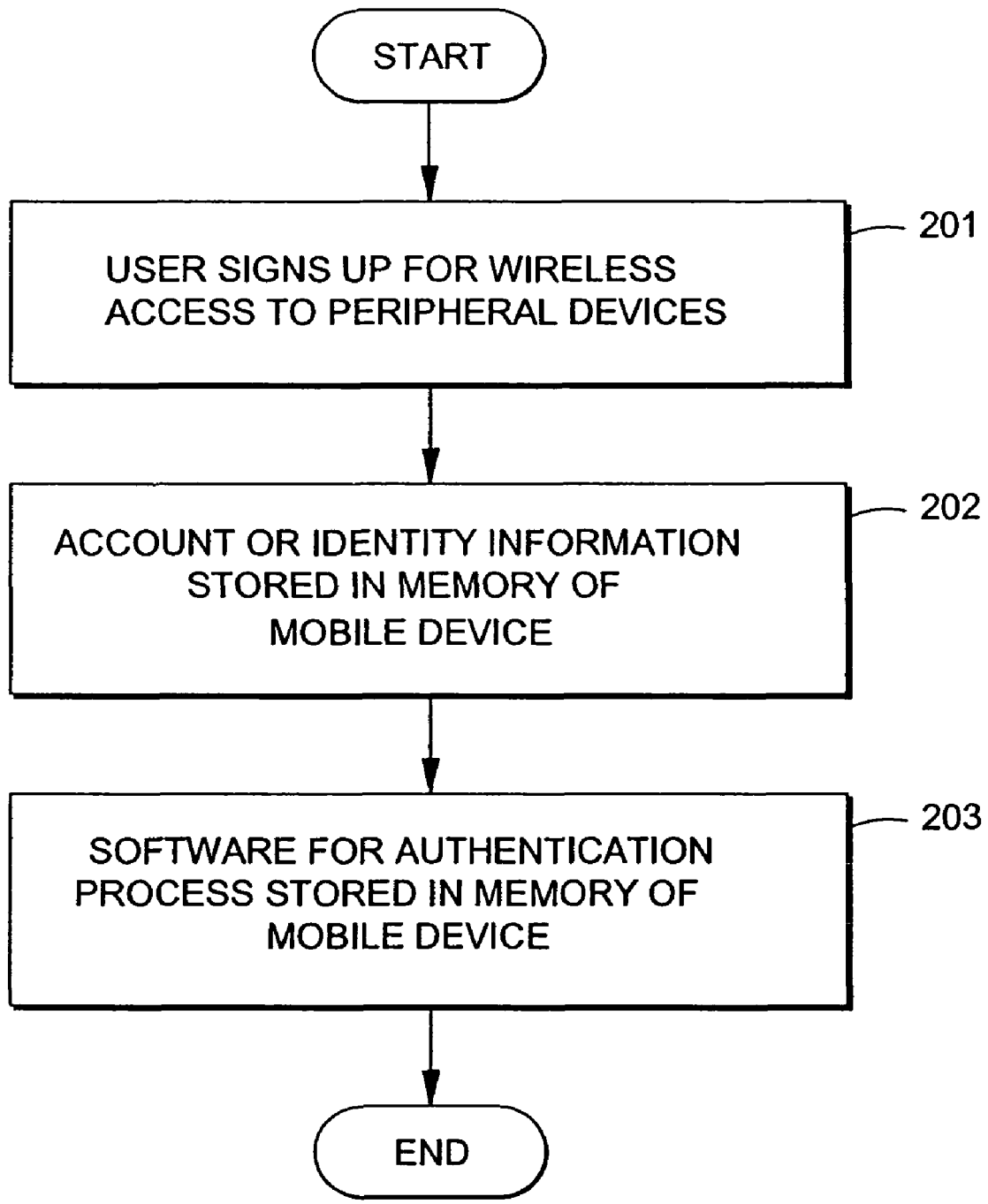
FIG. 2 illustrates a process for storing authentication information and instructions in a mobile device prior to entering a wireless hotspot.

Optionally, mobile device 100 may be configured to access only wireless networks whose network SSID matches a corresponding account stored in its memory (per the steps of FIG. 2). For purposes of simplicity, it is assumed mobile device 100 connects to the wireless network 150 depicted in FIG. 1.

In step 302, mobile device 100 uses the local wireless network at hotspot 155 to obtain access to the Internet 140. In this regard, if the user is entering hotspot 155 from another wireless network, a protocol such as WISPr could be used to facilitate roaming between the networks. At this point, the mobile device may or may not be required to send authentication and/or billing information. Again, as discussed above, many wireless networks are completely open to mobile users, and thus may not require the mobile device to be authenticated to a WISP server.

On the other hand, some hotspots may require a mobile device user to authenticate the mobile device to the WISP and perhaps pay on-site before obtaining wireless Internet access. As described above in connection with FIG. 2, a user may subscribe to one or more of these WISPs, and the mobile device may store authentication information for the WISP server. As also described above, mobile device 100 could store a program for contacting the WISP server via wireless network 150 and getting authenticated without any user interaction.

At any rate, mobile device 100 preferably obtains wireless access to Internet 140 at hotspot 155 without any input on the part of the user.

In step 303, mobile device 100 accesses service provider server 180 over the Internet 140 and transmits authentication information to service provider server 180. Preferably, the mobile device automatically contacts service provider server 180 over Internet 140 and transmits authentication information using the information and instructions stored in the steps described in FIG. 2.

In step 304, service provider server 180 authenticates mobile device 100 or its user as a customer or device having rights to get its offered services. Thus, for example, service provider server 180 uses the authentication information received from mobile device 100 to identify the mobile device, and determines if the received information matches the profile of a user authorized to access some or all of the peripheral devices offered at hotspot 155 by the service provider.

In step 305, the service provider server determines the location of the wireless hotspot where the mobile device is located using information received from the mobile device. For example, the service provider server 180 could use the unique IP source address of access point 120 contained in the messages sent from mobile device 100 to determine the location of access point 120 and its corresponding wireless network 150 and hotspot 155. Of course, other methods of location could also be used to identify the location of hotspot 155, such as a query/response protocol between service provider server 180 and access point 120, or a Global Positioning System (GPS) functionality embedded within the mobile device to locate the device and thereby determine the local wireless hotspot.

In step 306, service provider server 180 determines which peripheral devices (if any) are deployed at hotspot 155. This may be achieved by, for example, accessing a table or other reference stored in the memory of the service provider server which stores information about peripheral devices at particular locations. Alternatively, or in addition to the above, the service provider server could probe for peripheral devices near the access point, for example by contacting another server in the vicinity of the hotspot which manages information about the peripheral devices at the hotspot. Again, for purposes of simplicity, it is assumed in FIG. 1 that the only peripheral devices deployed at hotspot 155 are peripheral devices 190, 192 and 194.

In step 307, service provider server 180 sends an authorization to peripheral devices networked at wireless hotspot 155. In one embodiment, the determination of which peripheral devices receive an authorization could depend on the authentication information received from mobile device 100. For example, a user may have only paid or subscribed to certain types of services, such as printing. In this example, however, it is assumed that the user of mobile device 100 has subscribed to the services of all of peripheral devices 190, 192 and 194, and that all of these devices are sent an authorization.

In step 308, service provider server 180 instructs the authorized peripheral devices within the wireless hotspot that are able to wirelessly communicate with mobile device 100 to announce their presence to mobile device 100, and the devices do so. Thus, for example, service provider server 180 may send, along with the authorization, instructions to peripheral devices 190, 192 and 194 to send an announcement over wireless network 150 to mobile device 100. The announcements could include simple information such as the peripheral device's location and/or network name, but could also include more detailed information about the device, such as its capabilities, usage status, cost of usage, or a graphical icon of the device.

In practice, it is preferable that the announcements from the peripheral devices such as peripheral devices 190, 192 and 194 are encrypted in some manner, so as to prevent unauthorized usage of the peripheral devices, such as by eavesdropping mobile devices not authenticated by service provider server 180. Thus, in one embodiment, the instructions from service provider server 180 may additionally instruct the peripheral devices to announce their presence via encrypted messages. In this embodiment, the service provider server would also send a message to mobile device 100 containing decryption information, so that mobile device 100 could decrypt the announcements from the peripheral devices. Of course, other methods of secure transmission could be used.

In step 309, mobile device 100 "discovers" and displays the peripheral devices within hotspot 155 which are able to wirelessly communicate with mobile device 100 using the announcements received from the peripheral devices. In this regard, if the messages are encrypted as discussed above, they must first be decrypted using the decryption key sent from service provider server 180.

Using the announcements received from peripheral devices 190, 192 and 194, mobile device 100 displays information regarding the peripheral devices on its user interface. This display could be a display of a graphic icon for each peripheral device, a listing of printer names and locations, or any other appropriate display. In this way, the user is able to see the available peripheral devices that he or she is authorized to use within the wireless hotspot where the mobile device is currently located.

In step 310, the mobile device wirelessly accesses services of authorized peripheral device 190, 192 or 194 via the wireless network 150 at the wireless hotspot 155. Thus for example, the user may use the interface of a mobile device such as a digital camera to select pictures to transmit to printer 190 for printing, or may select and transmit pictures to DVD burner 192 so as to record a DVD of the pictures. This transmission may take place directly between mobile device 100 and the peripheral device, or these devices may additionally use access point 120 as a middleman. At any rate, the data is transferred locally over wireless network 150, ordinarily without congesting the Internet traffic.

Of course, as discussed above, peripheral devices cover a wide range of services, and the present invention is not in any way limited to printing or to DVD burning.

Figure 4:
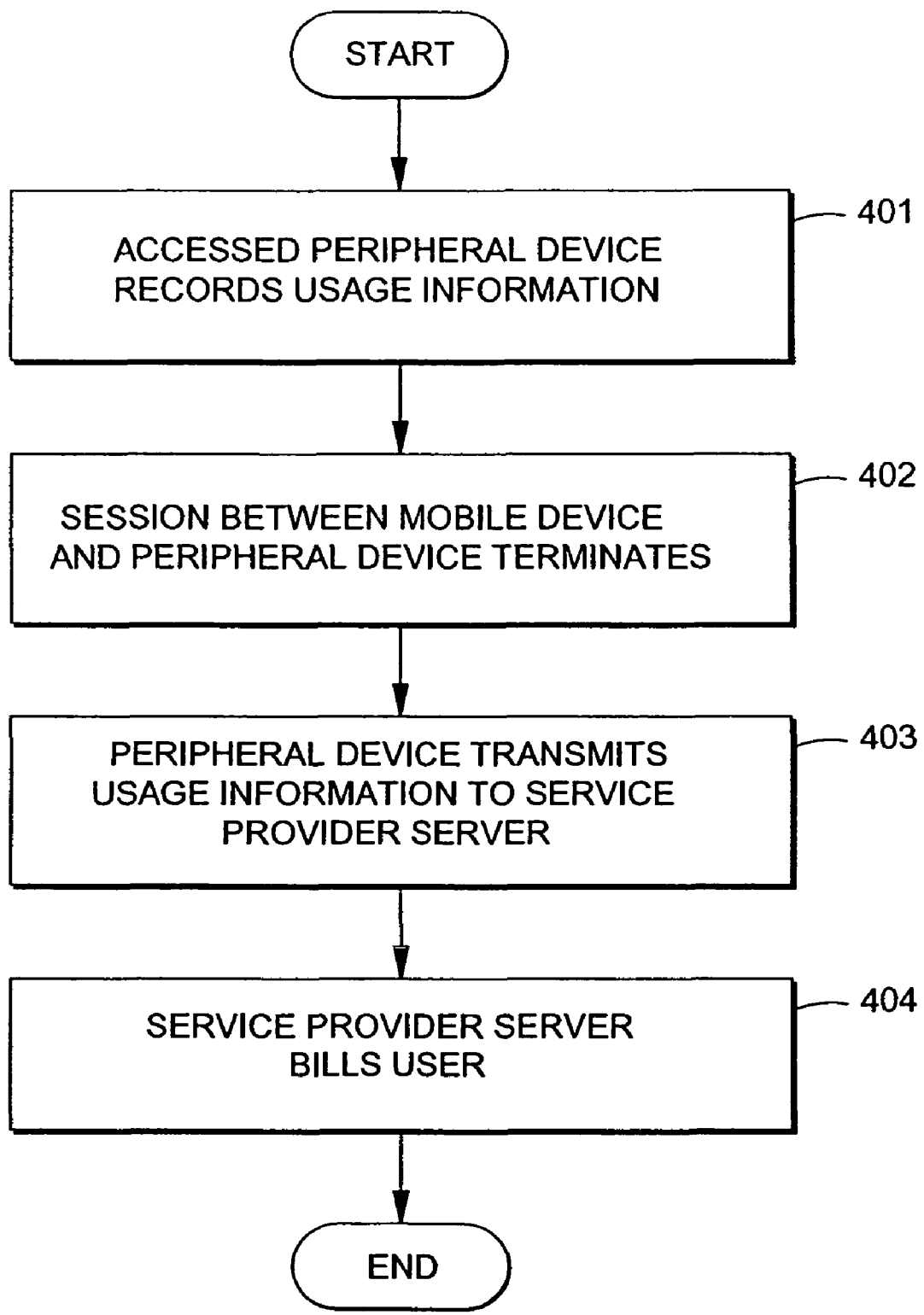
FIG. 4 illustrates an example of an accounting and billing process according to the present invention.

Finally, in step 311, accounting and billing for the services takes place. Obviously, this procedure could vary widely according to the preferences of a service provider, and so a sample embodiment for an accounting and billing process will now be described in more detail with respect to FIG. 4.

In order to bill a user for using a peripheral device, there is preferably some way to ascertain how much usage has taken place.

Thus, in step 401, an accessed peripheral device such as peripheral device 190, 192 or 194 records usage information pertaining to the amount of usage of the peripheral device by mobile device 100. For example, a peripheral device such as printer 190 could record data in its memory for every picture it prints during a session with mobile device 100.

In other embodiments, devices other than the peripheral devices 190, 192 and 194 could record the usage information. For example, since mobile device 100 is communicating with a peripheral device while accessing the device, mobile device 100 could also record usage information, although this might raise concerns with dishonest users attempting to alter the mobile device or cease transmission in order to avoid payment. In another embodiment in which a peripheral device is connected to computer and/or kiosk such as kiosk 195, the computer and/or kiosk could record the usage information.

In step 402, the session between mobile device 100 and the accessed peripheral device terminates. This can be accomplished in a number of ways. For example, the user could select to terminate the session with the peripheral device using the user interface of mobile device 100. In another example, the peripheral device could terminate the session based on a time-out, such as after a certain number of minutes have passed without any traffic from the mobile device. In yet another example, the number of pictures to be printed, DVDs to be burned, etc. could be predetermined by the user or service provider, and the session could simply end after the predetermined number is reached.

At this point, the peripheral device could optionally report the usage information or other information to the mobile device user before taking any further action, in order to verify the amount of usage. For example, peripheral device 190 could send a message to mobile device 100 such as "You will be billed for printing 30 pictures. Is this correct?". Additionally, the peripheral device could verify at this point that the user does not require further usage, via a message such as "Session Terminated. Do you still wish to print more images?"

Next, in step 403, the accessed peripheral device transmits the recorded usage information to service provider server 180 for billing for the services.

However, it must be noted that the recorded information could also be sent to service provider server 180 before the termination of the session between mobile device 100 and a peripheral device. In other words, it is not required that the session between the mobile device and peripheral device has ended before accounting information is sent to the service provider server. For example, usage information could be sent to service provider server 180 periodically while mobile device 100 is accessing the peripheral device, such as after each image is printed. Such an embodiment could be useful in a case where the devices are accidentally or intentionally disconnected in the middle of a transmission session.

Finally, in step 404, the service provider server 180 uses the received recorded image information to bill the user for the usage.

Preferably, the user's account is established as described above in FIG. 2. Billing the account could take place by any number of methods. For example, service provider server 180 could immediately debit the user's account. Alternatively, service provider server could collect usage information during a designated time period, such as a month, and then debit the account. In yet another example, a mobile device user could establish a pre-paid account with the service provider, and the service provider server could debit the prepaid account for the cost of the services (or number of pictures, etc.). In still another example, the account for mobile device 100 could be debited by service provider server prior to the termination of the session, perhaps first informing the user of the cost with a message such as "You will now be billed $7.85 for printing 8 pictures. Is this OK?"

Additionally, the service provider server may open a job ticket for the mobile device and a peripheral device prior to the mobile device accessing the peripheral device in step 310 of FIG. 3. For example, once the user of mobile device 100 has selected a peripheral device such as peripheral device 190, peripheral device 190 could send a notification to the server that it is about to be accessed by mobile device 100. This would alert service provider server to open a job ticket and expect usage information from peripheral device 190 to bill the user of mobile device 100.

Of course, other billing arrangements are possible. For example, service provider server 180 could transmit usage information to an accounting department of the service provider in order to send a bill to the user.

Accordingly, the present invention is seen to provide a mobile device with authentication, authorization, and accounting for access to peripheral devices at wireless hotspots, ordinarily without requiring interaction on the part of the mobile device user. Additionally, only low-volume information such as authentication information is transferred over the Internet, while high-volume data such as video images are transferred locally on the wireless local network. Thus, it may be possible to reduce mobile device usage of the service provider server, making the server available to more users over a period of time, and to reduce usage of broadband bandwidth, thus allowing more internet bandwidth to be available to other hotspot users. It may also be possible to reduce wear and tear on physical connectors of the mobile device or the peripheral device, since the mobile device and peripheral device are not necessarily required to have a wired connection.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of using a mobile device to access peripheral devices networked at a wireless hotspot, said method comprising steps of:
    authenticating the mobile device to a service provider server using a wireless network at the wireless hotspot;
    determining the peripheral devices networked at the wireless hotspot that can be accessed by the mobile device, wherein the peripheral devices are determined by the service provider server based on a location of the wireless hotspot;
    receiving an authorization from the service provider server to the peripheral devices networked at the wireless hotspot;
    instructing, by the service provider server, the peripheral devices networked at the wireless hotspot to announce their presence via an encrypted message;
    making announcements of their presence via an encrypted message, by the peripheral devices networked at the wireless hotspot;
    sending, by the service provider server, a message to the mobile device containing decryption information for decrypting the announcements from the peripheral devices networked at the wireless hotspot;
    decrypting, by the mobile device, the announcements from the peripheral devices networked at the wireless hotspot using the received decryption information, and displaying the peripheral devices that are able to communicate with the mobile device, and
    wirelessly accessing services of an authorized peripheral device, selected by a user from the displayed peripheral devices, via the wireless network at the wireless hotspot using the mobile device, wherein the mobile device and the selected authorized peripheral device perform direct communication with each other.

2. The method according to claim 1, wherein the service provider server determines the location of the wireless hotspot where the mobile device is located using information received from the mobile device.

3. The method according to claim 1, wherein the selected authorized peripheral device records usage information pertaining to an amount of usage of the selected authorized peripheral device by the mobile device, and transmits recorded usage information to the service provider server for billing for the services.

4. The method according to claim 1, wherein the mobile device is authenticated to the service provider server using information stored in a memory of the mobile device prior to entering the wireless hotspot.

5. The method according to claim 1, wherein the mobile device is a wireless camera, mobile telephone, wireless media player, wireless display or wireless digital video recorder, and the peripheral device is a printer, media server, or digital media recorder.

6. The method according to claim 1, wherein the mobile device is authenticated to the service provider server over the Internet.

7. A wireless hotspot system, comprising:
    a wireless network accessible by a mobile device;
    peripheral devices networked at the wireless hotspot; and
    a service provider server configured to authenticate the mobile device to allow access to the peripheral devices networked at the wireless hotspot,
    wherein the mobile device is authenticated to the service provider server using the wireless network,
    wherein the service provider server determines the peripheral devices networked at the wireless hotspot accessed by the mobile device, based on a location of the wireless hotspot,
    wherein the peripheral devices networked at the wireless hotspot are sent an authorization,
    wherein the mobile device wireless accesses services of an authorized peripheral device via the wireless network at the wireless hotspot based on the authorized,
    wherein the service provider server instructs authorized peripheral devices within the wireless hotspot that are able to wirelessly communicate with the mobile device to announce themselves to the mobile device via an encrypted message,
    wherein the authorized peripheral devices make announcements of their presence to the mobile device using an encrypted message, and the mobile device is sent decryption information from the service provider server to decrypt the encrypted messages,
    wherein the mobile device displays the authorized peripheral devices that are able to wirelessly communicate with the mobile device using the announcements received from the peripheral devices,
    wherein an accessed peripheral device is selected by a user from the displayed authorized peripheral devices, and
    wherein the mobile device and the accessed peripheral device perform direct communication with each other.

8. The system according to claim 7, wherein the service provider server determines the location of the wireless hotspot where the mobile device is located using information received from the mobile device.

9. The system according to claim 7, wherein the accessed peripheral device records usage information pertaining to an amount of usage of the accessed peripheral device by the mobile device, and transmits recorded usage information to the service provider server for billing for the services.

10. The system according to claim 7, wherein the mobile device is authenticated to the service provider server using information stored in a memory of the mobile device prior to entering the wireless hotspot.

11. The system according to claim 7, wherein the mobile device is a wireless camera, mobile telephone, wireless media player, wireless display or wireless digital video recorder, and the peripheral device is a printer, media server, or digital media recorder.

12. The system according to claim 7, wherein the mobile device is authenticated to the service provider server over the Internet.

13. A method for a mobile device to access peripheral devices networked at a wireless hotspot, comprising:
- transmitting authentication information from the mobile device to a service provider server using a wireless network at the wireless hotspot;
- determining, by the service provider server, peripheral devices networked at the wireless hotspot that can be accessed by the mobile device based on a location of the wireless hotspot;
- instructing, by the service provider server, the peripheral devices to announce themselves to the mobile device via an encrypted announcement message;
- receiving the encrypted announcement message from a peripheral device;
- receiving decryption information from the service provider server;
- decrypting the encrypted announcement message using the decryption information;
- displaying peripheral devices that are able to wirelessly communicate with the mobile device using the decrypted announcement message;
- receiving a selection by a user from the displayed peripheral devices, of a peripheral device for access; and
- wirelessly accessing services of the selected peripheral device from the mobile device via the wireless network at the wireless hotspot, wherein the mobile device and the selected peripheral device perform direct communication with each other.

14. The method according to claim 13, wherein the service provider server determines the location of the wireless hotspot where the mobile device is located using information received from the mobile device.

15. The method according to claim 13, wherein the selected peripheral device records usage information pertaining to an amount of usage of the selected peripheral device by the mobile device, and transmits the recorded usage information to the service provider server for billing for the services.

16. The method according to claim 13, wherein the mobile device is authenticated to the service provider server using information stored in a memory of the mobile device prior to entering the wireless hotspot.

17. The method according to claim 13, wherein the mobile device is a wireless camera, mobile telephone, wireless media player, wireless display or wireless digital video recorder, and the peripheral device is a printer, media server, or digital media recorder.

18. The method according to claim 13, wherein the mobile device is authenticated to the service provider server over the Internet.

19. A method for a service provider to provide a mobile device with access to peripheral devices networked at a wireless hotspot, comprising:
- receiving authentication information from the mobile device in the wireless hotspot;
- determining the peripheral devices networked at the wireless hotspot that can be accessed by the mobile device, based on a location of the wireless spot;
- sending an authorization to the peripheral devices networked at the wireless hotspot;
- instructing authorized peripheral devices within the wireless hotspot that are able to wirelessly communicate with the mobile device to announce themselves to the mobile device via an encrypted message; and
- sending the mobile device decryption information to decrypt the encrypted messages,
- displaying the authorized peripheral devices on the mobile device;
- selecting an authorized peripheral device to wirelessly accessing services of selected authorized peripheral device by the mobile device;
- wherein the mobile device and the selected authorized peripheral device wirelessly perform direct communication with each other.

20. The method according to claim 19, wherein the service provider server determines the location of the wireless hotspot where the mobile device is located using the received authentication information.

21. The method according to claim 19, wherein
- the mobile device accesses a peripheral device which received an authorization from the service provider server; and
- the service provider server receives usage information from the accessed peripheral device for billing for the services.

22. The method according to claim 19, wherein the service provider server receives authentication information from the mobile device over the Internet.

\* \* \* \* \*